United States Patent [19]
Ueda

[11] Patent Number: 5,291,300
[45] Date of Patent: Mar. 1, 1994

[54] MOTION VECTOR DETECTING APPARATUS FOR DETECTING MOTION OF IMAGE TO PREVENT DISTURBANCE THEREOF

[75] Inventor: Kazuhiko Ueda, Yokohama, Japan

[73] Assignee: Victor Company of Japan, Ltd., Yokohama, Japan

[21] Appl. No.: 826,138

[22] Filed: Jan. 27, 1992

[30] Foreign Application Priority Data

Jan. 25, 1991 [JP] Japan .................. 3-025442

[51] Int. Cl.⁵ .............. H04N 5/76; H04N 7/18; H04N 5/228
[52] U.S. Cl. .................. 358/335; 354/410; 354/430; 348/208
[58] Field of Search .......... 358/105, 108, 906, 909, 358/222, 209, 335, 310; 354/430, 402, 403, 410, 406, 407, 408; H04N 5/76, 5/78, 5/781, 5/782, 5/783, 5/225, 7/18, 5/30, 5/228, 9/79

[56] References Cited

U.S. PATENT DOCUMENTS

| | | | |
|---|---|---|---|
| 4,397,545 | 8/1983 | Terashita | 358/906 |
| 4,612,575 | 9/1986 | Ishman et al. | 358/105 |
| 4,709,264 | 11/1987 | Tamura et al. | 358/105 |
| 4,786,987 | 11/1988 | Fujimura et al. | 358/909 |
| 4,938,588 | 7/1990 | Taniguchi | 354/403 |
| 5,030,984 | 7/1991 | Buckler et al. | 358/105 |
| 5,099,323 | 3/1992 | Morimura et al. | 358/105 |
| 5,107,293 | 4/1992 | Sekine et al. | 354/430 |
| 5,161,026 | 11/1992 | Mabuchi et al. | 358/909 |

FOREIGN PATENT DOCUMENTS 61-269475  11/1986  Japan .

Primary Examiner—Tommy P. Chin
Assistant Examiner—Thai Tran
Attorney, Agent, or Firm—Jacobson, Price, Holman & Stern

[57] ABSTRACT

A motion vector detecting apparatus detects only motion vectors generated by fluctuation of a video camera even if an object subject to imaging moves within a picture. This detecting apparatus comprises a distance information detecting circuit for detecting distance information from objects corresponding to detection windows obtained by dividing a picture into a plurality of blocks to an imaging device, an information detecting circuit for detecting motion information substantially corresponding to the plurality of divided detection windows, and a calculation circuit for determining weighting coefficients on the basis of at least the distance information and for determining motion vectors on the basis of the weighting information and the motion information.

9 Claims, 8 Drawing Sheets

| 10 | 10 | 15 | 13 | 14 | 15 | 16 |
|----|----|----|----|----|----|----|
| 8  | 10 | 16 | 15 | 17 | 8  | 10 |
| 4  | 10 | 2  | 3  | 3  | 3  | 5  |
| 4  | 9  | 2  | 2  | 2  | 3  | 5  |
| 11 | 11 | 2  | 1  | 3  | 1  | 6  |
| 10 | 9  | 2  | 2  | 3  | 2  | 6  |
| 4  | 8  | 8  | 8  | 9  | 8  | 7  |

FIG.6

| 5 | 5 | 4 | 3 | 4 | 5 | 5 |
|---|---|---|---|---|---|---|
| 5 | 3 | 2 | 2 | 2 | 3 | 5 |
| 4 | 2 | 0 | 0 | 0 | 2 | 4 |
| 3 | 2 | 0 | 0 | 0 | 2 | 3 |
| 4 | 2 | 0 | 0 | 0 | 2 | 4 |
| 5 | 3 | 2 | 2 | 2 | 3 | 5 |
| 5 | 5 | 4 | 3 | 4 | 5 | 5 |

FIG.7

MOTION VECTOR DETECTING APPARATUS FOR DETECTING MOTION OF IMAGE TO PREVENT DISTURBANCE THEREOF

BACKGROUND OF THE INVENTION

This invention relates to a motion vector detecting apparatus suitable in carrying out correction of unintentional movement of the hands of, e.g., a video camera.

FIGS. 1A and 1B are views for explaining motion vector in a picture.

At present, in order to prevent distrubance (blurring) of an image, which takes place by unintentional movement (trembling) of the hands of a video camera, there is known a technique to detect movement of an image by unintentional movement of the hands to permit an image to be corrected by motion vectors obtained by detection of unintentional movement of the image.

Hitherto, in order to detect motion vector, as shown in FIG. 1A, a picture 1 taken is divided into a plurality of blocks to assume respective blocks as detection windows 1a to detect the direction of movement and a quantity of movement per each block. Then, a mean value of all the motion vectors which have been detected from the respective detection windows 1a of the picture 1 at a motion vector detecting circuit.

However, in FIG. 1B, in taking, by using a video camera, a picture of a moving object 1b moving from the right to the left of the picture 1, if this video camera fluctuates from the upward direction to the downward direction of the picture 1, different motion vectors A11 and C11 would take place within the picture 1. In this figure, a vector occurring by fluctuation of the video camera is a motion vector A11, a vector occurring by movement of the moving object 1b is a motion vector B11, and a resultant vector of the motion vectors A11 and B11 is a motion vector C11.

In FIG. 1A, motion vectors C11 are detected from detection windows 1a encompassed by dotted lines, and motion vectors A11 are detected from detection windows 1a except for the above. The moving object 1b corresponds to the detection windows 1a encompassed by dotted lines.

Meanwhile, the above-described motion vector detecting circuit for averaging motion vectors detected from all the detection windows 1a to detect it as a motion vector of the picture 1 detects a motion vector of the picture 1 as an average value of the motion vectors A11 and C11.

Accordingly, the conventional motion vector detecting circuit was unable to detect the motion vector A11 by itself. In this connection, the motion vectors A11 are necessary for preventing disturbance (blurring) of an image occurring by unintentional movement of the hands of a video camera.

SUMMARY OF THE INVENTION

To contemplate solving the above-mentioned problems, an object of this invention is to provide a motion vector detecting circuit capable of discriminating between motion vectors A11 produced by fluctuation of a video camera and motion vectors B11 produced by movement of a moving object 1b to allow only the motion vector A11 to be detected, thereby providing an image of a moving object free from disturbance (blurring) of an image.

To solve the above-mentioned problems, this invention provides a motion vector detecting apparatus comprising a distance information detecting circuit for detecting distance information from objects corresponding to respective detection windows obtained by dividing a picture into a plurality of blocks up to an imaging device, a motion information detecting circuit for detecting motion information substantially corresponding to the respective plural divided detection windows, and a calculation circuit for determining weighting coefficients at least by distance information detected by the distance information detecting circuit, and for determining motion vectors by the weighting coefficients and the motion information.

As described above, since the motion vector detecting circuit comprises a distance information detecting circuit for detecting distance information from objects corresponding to respective detection windows obtained by dividing a picture into a plurality of blocks up to an imaging device, a motion information detecting circuit for detecting motion information substantially corresponding to the respective plural divided detection windows, and a calculation circuit for determining weighting coefficients by distance information detected at least by the distance information detection circuit, and for determining motion vectors by the weighting coefficients and the motion information, it is possible to regard as important motion information corresponding to detection windows where objects remote from the imaging device exists, and to provide motion vectors from the portion of background even in the case where a moving object exists within a picture. As a result, it is possible to precisely detect motion vectors produced by fluctuation of a video camera.

BRIEF DESCRIPTION OF THE DRAWINGS

In the accompanying drawings:

FIG. 6 is a view for explaining distance information corresponding to respective detection windows in the first embodiment;

FIG. 7 is a view for explaining position information corresponding to respective detection windows in the first embodiment;

DETAILED DESCRIPTION OF THE PREFERRED EMBODIMENTS

Essentially, this invention provides a motion vector detecting apparatus to discriminate between motion vectors A11 produced, e.g., by fluctuation of a video camera and motion vectors B11 produced by movement of a moving object 1b, thus permitting only the motion vectors A11 to be detected.

Figure 2:
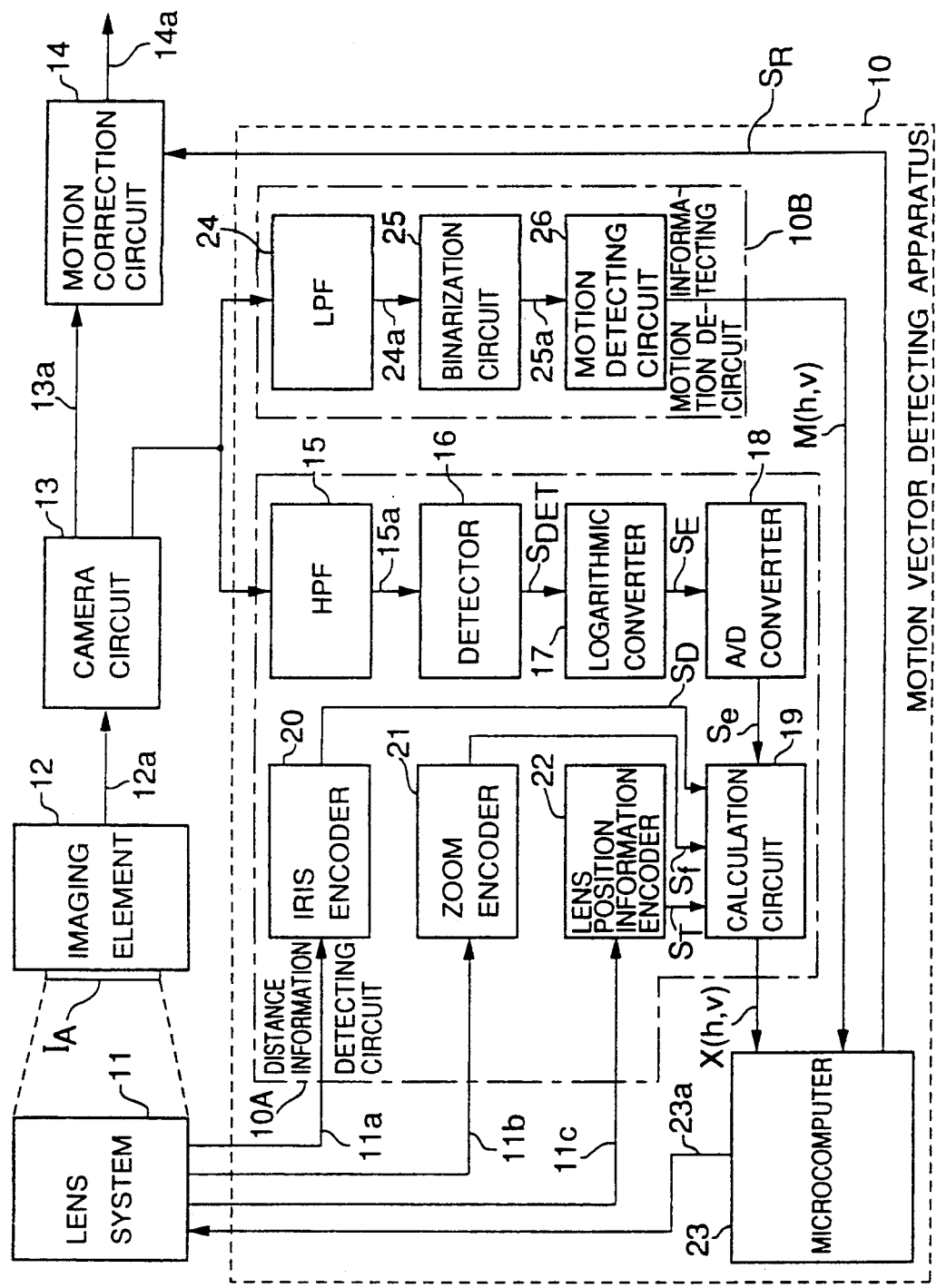
FIG. 2 is a block diagram showing the outline of the configuration of a video camera to which a motion vector detecting apparatus according to a first embodiment of this invention is applied.
Figure 3A:
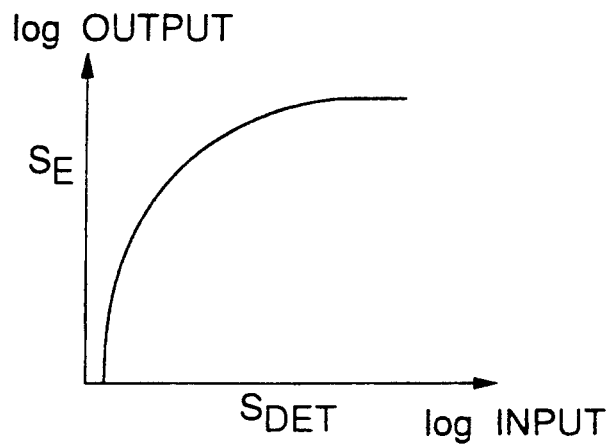
FIGS. 3A and 3B are input/output characteristic diagrams for explaining the operation of the distance information detecting circuit 10A shown in FIG. 2.
Figure 3B:
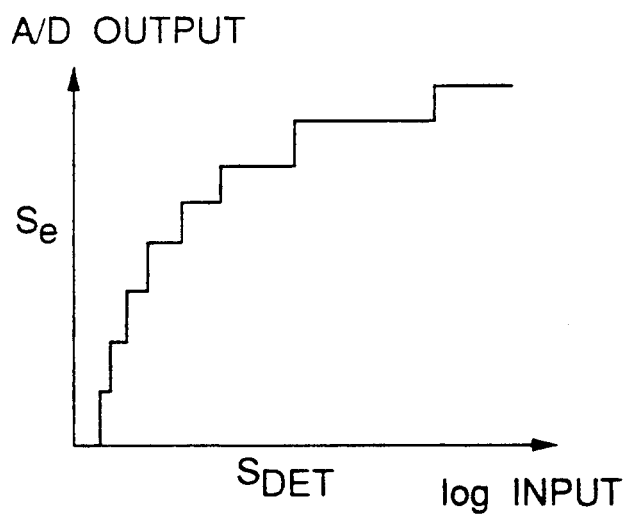
Figure 4:
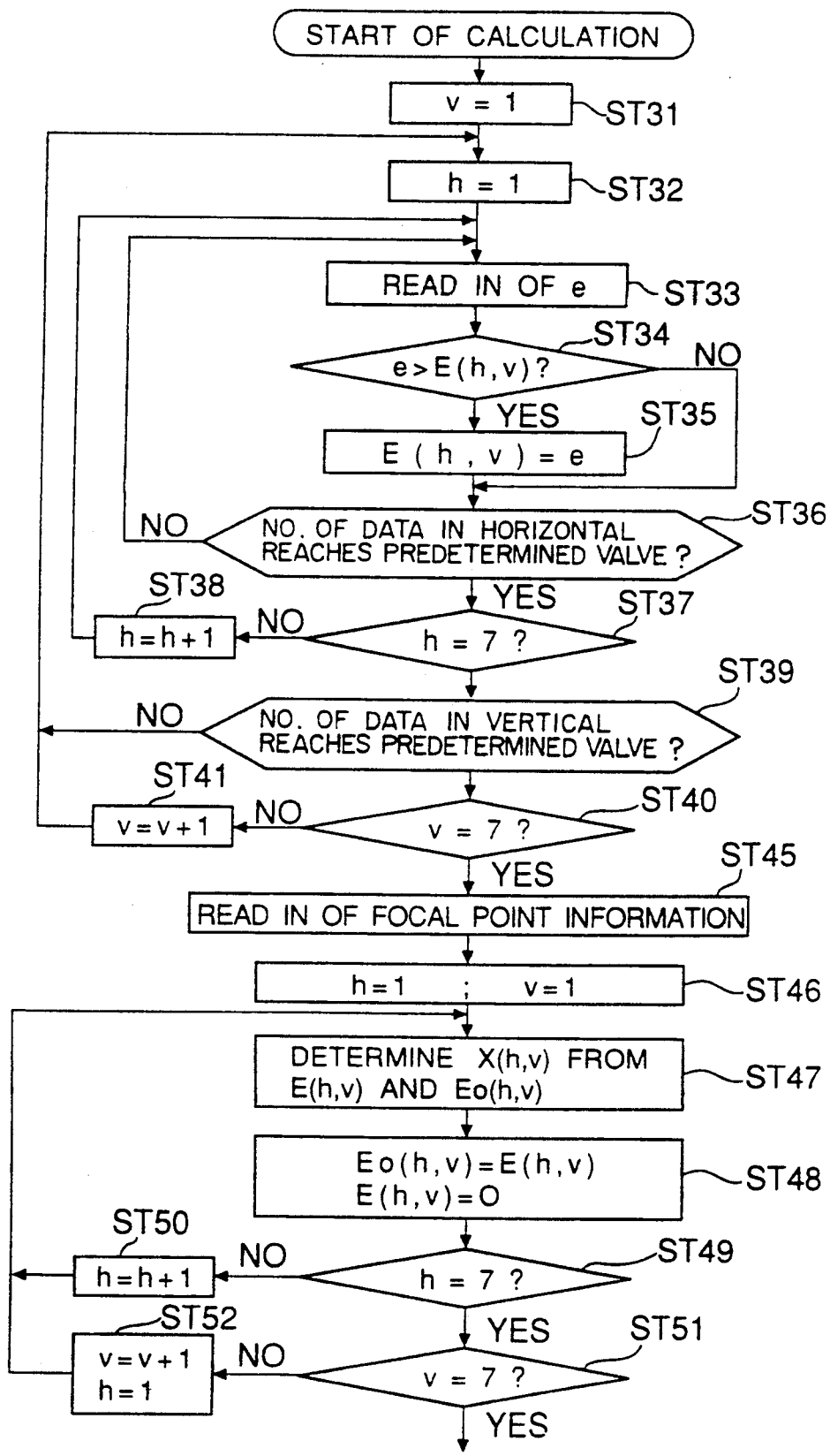
FIG. 4 is a flowchart for determining weighting coefficients in the motion vector detecting apparatus according to the first embodiment.
Figure 5:
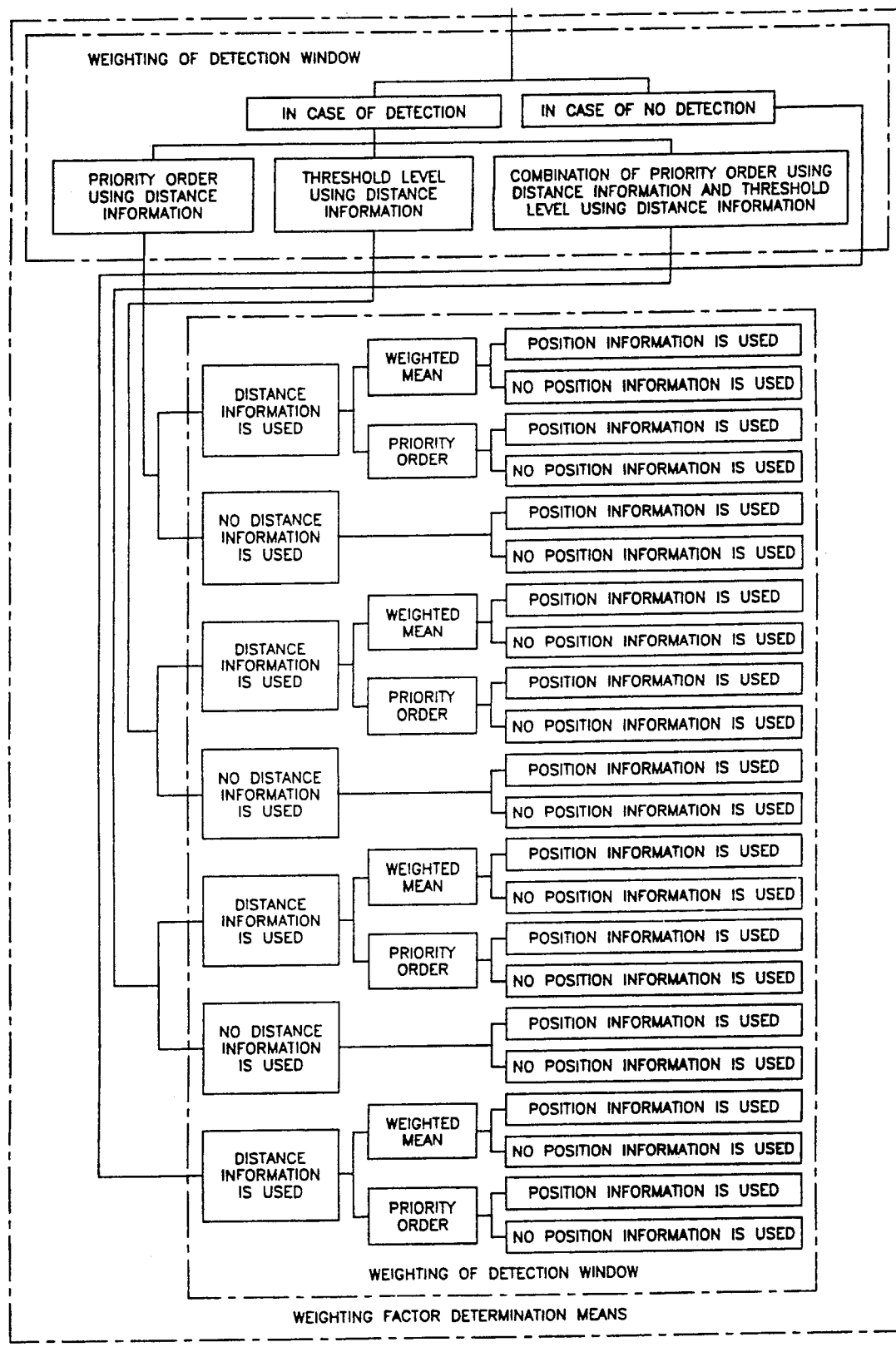
FIG. 5 is a view for explaining means for determining weighting coefficients.
Figure 8:
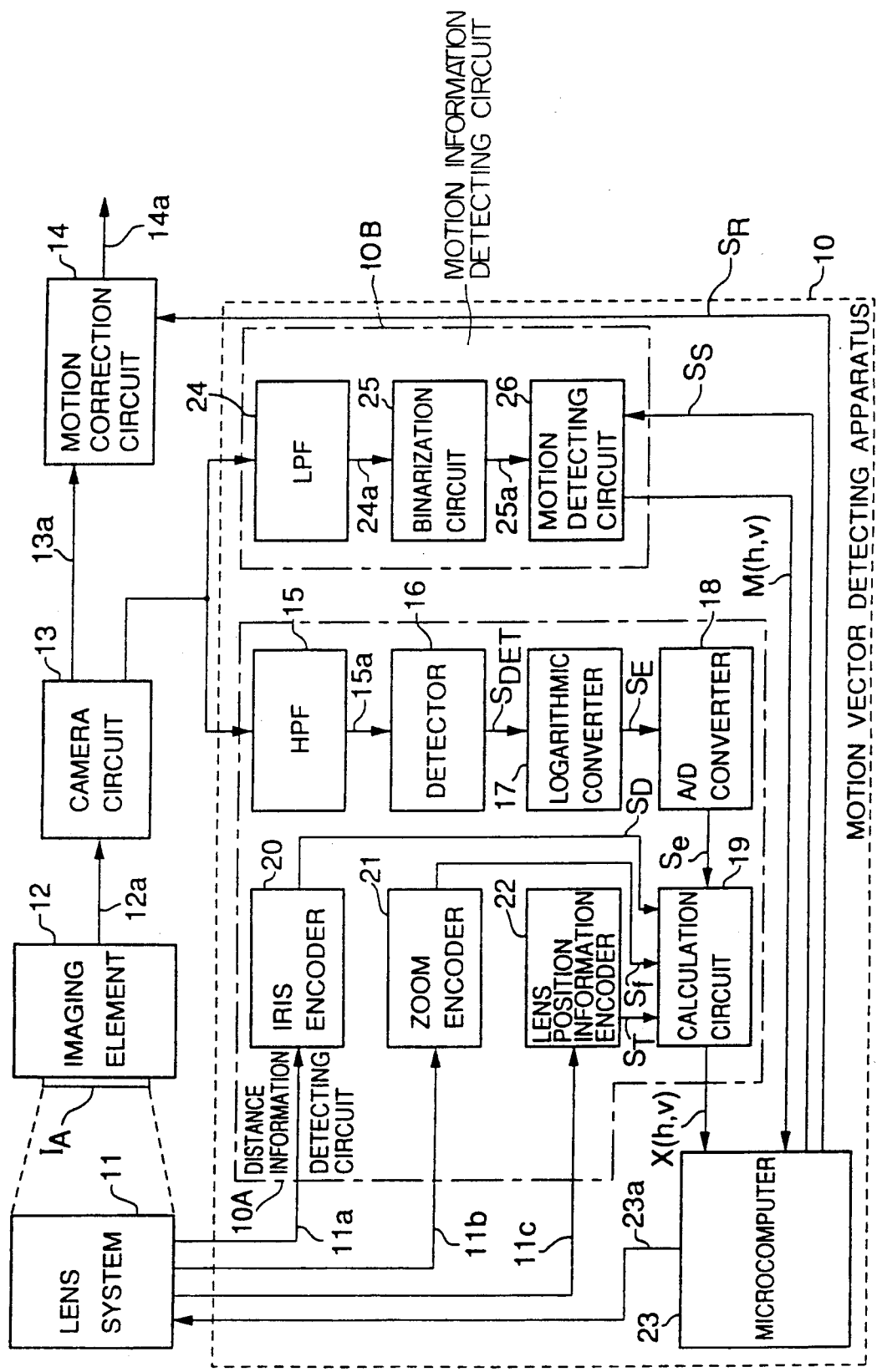
FIG. 8 is a block diagram showing the outline of the configuration of a video camera to which a motion vector detecting apparatus according to a second embodiment of this invention is applied.
Figure 9:
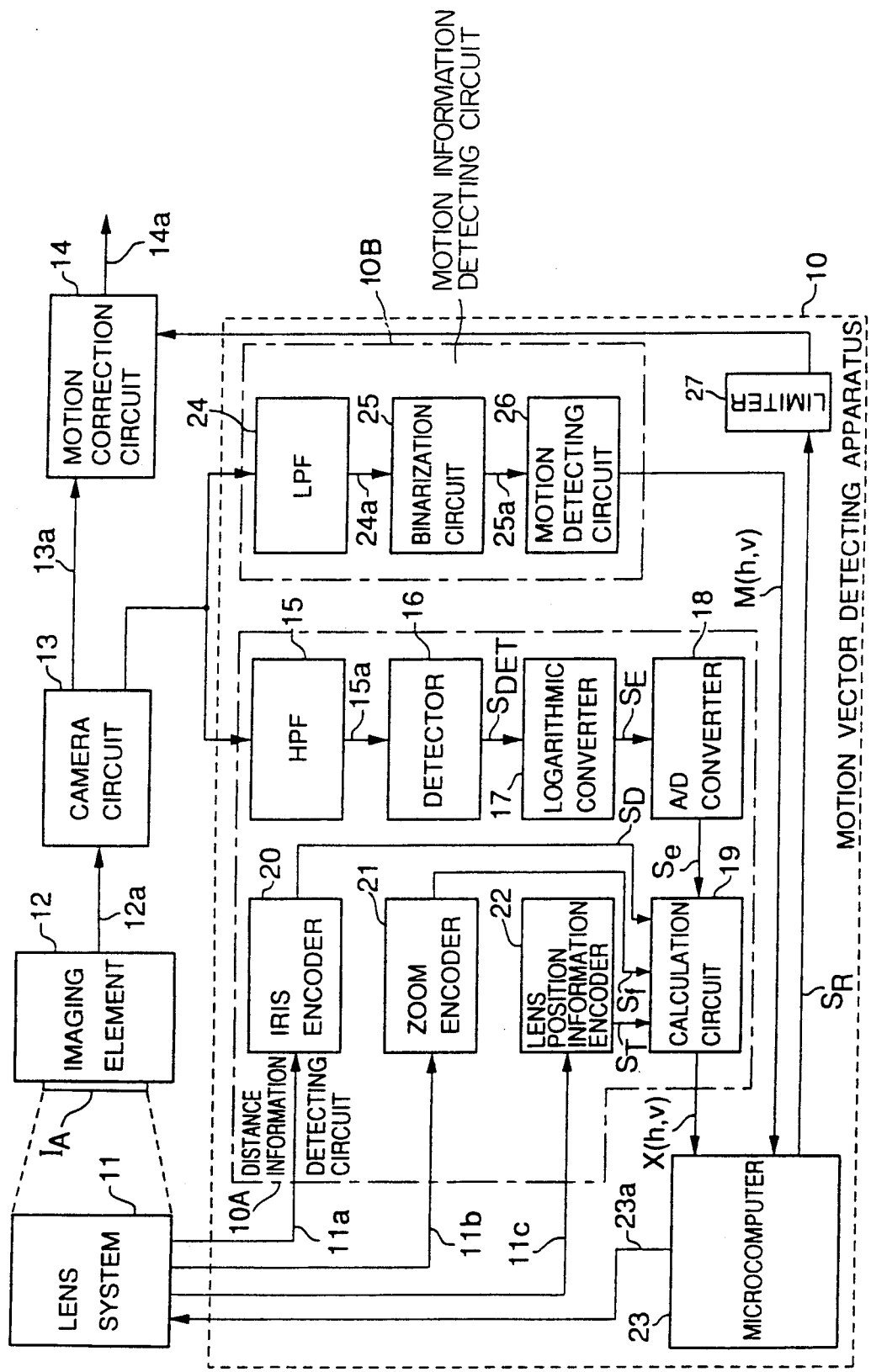
FIG. 9 is a block diagram showing the outline of the configuration of a video camera to which a motion vector detecting apparatus according to a third embodiment of this invention is applied.

FIG. 2 is a block diagram showing the outline of the configuration of a video camera to which a motion vector detecting apparatus according to a first embodiment of this invention is applied, FIGS. 3A and 3B are input/output characteristic diagrams for explaining the operation of the distance information detecting circuit 10A shown in FIG. 2, FIG. 4 is a flowchart for determining weighting coefficients, FIG. 5 is a view for explaining means for determining weighting coefficients, FIG. 6 is a view for explaining distance information corresponding to respective detection windows, FIG. 7 is a view for explaining position information corresponding to respective detection windows, FIGS. 8 and 9 are a block diagrams showing the outlines of the configurations of a video camera to which a motion vector detecting apparatus according to second and third embodiments of this invention, respectively.

Preferred embodiments of this invention will now be described with reference to the attached drawings.

A vector motion detecting apparatus 10 according to this invention roughly comprises, as shown in FIG. 2, a distance information detecting circuit 10A, a motion information detecting circuit 10B, and a microcomputer (claculation means) 23. Further, a video camera is comprised of the above-mentioned motion vector detecting apparatus 10 and a video camera section which will be described later.

The operation of the video camera section will be first described and the operation of the motion vector detecting apparatus 10 will be then described.

I. Description of the Operation of the Video Camera Section

The video camera section is comprised of, as shown in FIG. 2, a lens system 11, an imaging element 12, a camera circuit 13, a motion correction circuit, and a video signal recording/reproducing system (not shown).

A lens position of the lens system 11 is continually moved very slightly back or forth along its optical axis every field in order to get distance information described later.

The above-mentioned imaging element 12 changes, by photoelectric conversion, an optical image $I_A$ formed on its photoelectric conversion surface through the lens system 11 to a video signal 12a to output it.

The above-mentioned camera circuit 13 generates and outputs a composite video signal 13a and a luminance signal 13b obtained by implementing processing such as filtering or blanking etc. to the video signal 12a delivered from the imaging element 12.

The above-mentioned motion correction circuit 14 temporarily stores the composite video signal delivered from the camera circuit 13 thereafter to read out the composite video signal stored by a motion vector detection signal $S_R$ corresponding to the motion vector A11 delivered from calculation means (microcomputer 23) of the motion vector detecting circuit 10, thus to deliver it to the video signal recording/reproducing system (not shown). In this readout operation, the readout start address is changed by the motion vector detection signal $S_R$. This motion correction circuit 14 may be constituted with, e.g., a field memory.

The above-mentioned video signal recording/reproducing system (not shown) is the same structure as that of a well known video signal recording/reproducing system in a VTR, and serves to record and reproduce an image of a moving object having no disturbance (blurring) of an image.

Further, the video camera section constructed as described above deliverers the following signals to the motion vector detecting apparatus 10. Namely, the above-mentioned lens system 11 delivers an iris information signals 11a, a zoom information signal 11b, and a lens information signal 11c to the motion vector detecting apparatus 10 (distance information detecting circuit 10A). In addition, the above-mentioned camera circuit 13 delivers a luminance signal 13b to the motion vector detecting apparatus 10 (the distance information detecting circuit 10A, the motion information detecting circuit 10B).

II. Description of the Operation of the Motion Vector Detecting Apparatus

The operation of the motion vector detecting apparatus 10 will now be described in order of the distance information detecting circuit 10A, the motion information detecting circuit 10B and the microcomputer 23 constituting the motion vector detecting apparatus 10.

(a) Description of the Operation of the Distance Information Detecting Circuit 10A The distance information detecting circuit 10A is comprised of, as shown in FIG. 2A, e.g., a high-pass filter (HPF) 15, a detector 16, a logarithmic converter (log) 17, an analog-to-digital converter (A/D) 18, a calculation circuit 19, an iris encoder 20, a zoom encoder 21, and a lens position information encoder 22.

The above-mentioned high-pass filter 15 extracts a high frequency band signal component of a luminance signal 13b delivered from the video camera section (camera circuit 13) to output an edge signal 15a.

The above-mentioned detector 16 detects the edge signal 15a delivered from the high-pass filter 15 to output a detection signal SDET corresponding to the contour of the above-mentioned moving object 1b. This detection signal $S_{DET}$ is, e.g., a focal point voltage as described later, i.e., a control signal used for allowing an object to be automatically in focus.

The above-mentioned logarithmic converter 17 applies logarithmic conversion to the detection signal $S_{DET}$ delivered from the detector 16 to output a logarithmic conversion detection signal $S_E$. This conversion characteristic is represented by a characteristic curve of the logarithmic conversion detection signal $S_E$ with respect to the detection signal $S_{DET}$ as shown in FIG. 3A. Namely, a change of the detection signal $S_{DET}$ in its relatively small level is converted as a relatively large change of the logarithmic conversion detection signal $S_E$.

The above-mentioned A/D converter 18 outputs a conversion signal Se obtained by applying analog-to-digital conversion to the logarithmic conversion detection signal $S_E$ delivered from the logarithmic converter 17. The characteristic of the conversion signal Se is represented by the characteristic curve of the conversion signal Se with respect to the detection signal $S_{DET}$ as shown in FIG. 3B. Namely, a detection signal $S_{DET}$ of a relatively small level is converted as a relatively large change of the conversion signal Se of a relatively large level. The quantization step widths of the conversion signal Se are substantially equal to each other. Accordingly, a conversion signal $S_e$ serving as, e.g., a digitalized focal point signal having relatively high quantization resolution in the vicinity of low level of the detection signal $S_{DET}$ is provided therefrom.

The above-mentioned calculation circuit 19 is supplied with the conversion signal Se from the A/D converter 18, a stop information signal SD obtained by applying analog-to-digital conversion to an iris information signal 11a from the lens system 11 by the iris encoder 20, a focal length information signal Sf obtained by applying analog-to-digital conversion to the zoom information signal 11b from the lens system 11 by a zoom encoder 21, and a lens position signal ST obtained by applying analog-to-digital conversion to the lens information signal 11c from the lens system 11 by a lens position information encoder 22, thus to output distance information X (h, v) which will be described later.

Figure 1A:
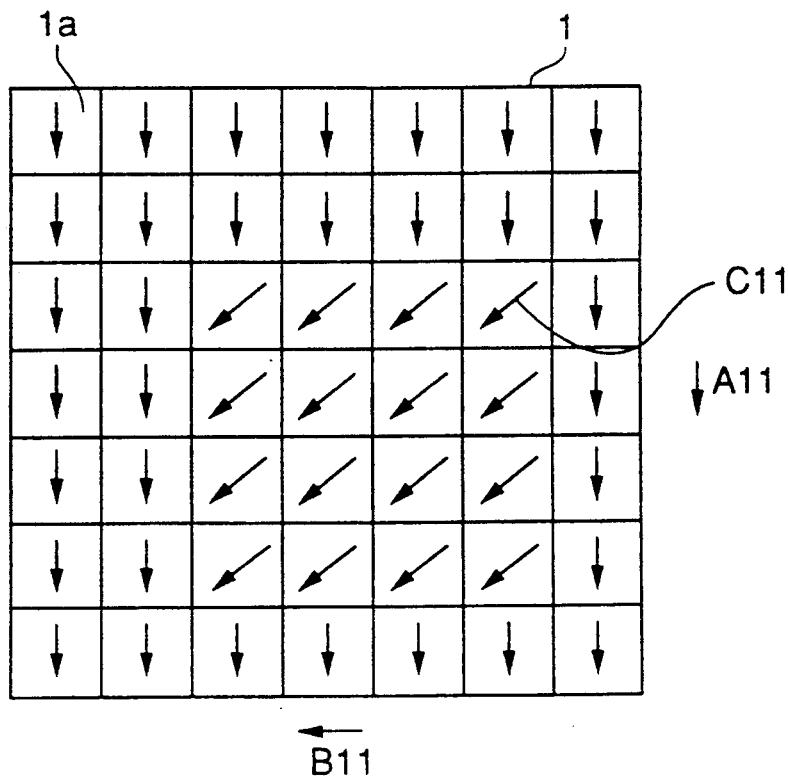
FIGS. 1A and 1B are explanatory views for explaining motion vectors within a picture in a conventional motion vector detecting apparatus.
Figure 1B:
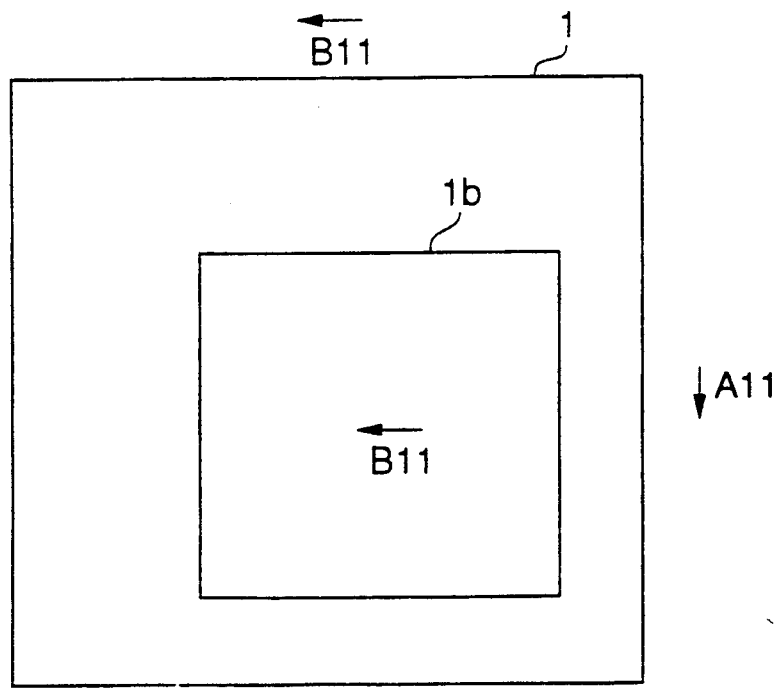

This calculation circuit 19 is comprised of, e.g., a microcomputer, etc., and detects and outputs in succession distance information X (h, v) of respective detection windows 1a (h and v respectively represent position in a horizontal direction, and position in a vertical direction) divided into, e.g., 49 detection windows 1a in total of seven detection windows in a horizontal direction by seven detection windows in a vertical direction (7×7) as indicated by the picture 1 shown in FIG. 1A. The distance information X(h, v) is information which represents a distance between an object imaged in the detection window (h, v) and the imaged surface of the imaging device 12 and is defined by a characteristic of the lens system 11, and the distance information X(h, v) is actually expressed by a distance between the imaged surface of the imaging device 12 and a lens position in focuss with respect to the object.

Since the positions of respective detection windows 1a can be specified by the coordinates (h, v), calculations from the distance information X (1, 1) of the detection window 1a at the left and upper end of the picture 1 to the distance information X (7, 7) of the detection window 1a at the right and lower end thereof are successively carried out.

The operation of the calculation circuit 19 will now be described with reference to the flowchart shown in FIG. 4.

The operation of the calculation circuit 19 is classified into the operation for an imaging interval within one field (steps ST31 to ST41) and the operation for a vertical blanking interval (steps ST45 to ST52).

The operation for an imaging interval will be first described.

During this time period, the operation for inputting all the maximum values of conversion signals e outputted from (1, 1) at the left and upper end to (7, 7) at the left and lower end of the picture 1 is carried out.

Namely, the value v of a vertical counter (not shown) and the value h of a horizontal counter (not shown) constituting the calculation circuit 19 are set to "1" and "1", respectively (steps ST31, ST32). Then, conversion signals Se of the detection window 1a of (1, 1) are read in a plurality of times over a predetermined time period. Every time these conversion signals are read in, each conversion signal Se of a relatively large level is taken in (steps ST33, ST34, ST35). In the case where a conversion signal Se thus read in is not conversion signal of a relatively large level, the operation proceeds to step ST36, at which whether or not the number of data in a horizontal direction within the detection window 1a has reached a predetermined value is judged. As a result, in the case where it is judged that the number of data in the horizontal direction has not reached the predetermined value, the operation returns to the above-mentioned step ST33.

Thereafter, the operation proceeds to the step ST36. At this step, when it is judged that the number of data in the horizontal direction within the detection window 1a has reached the predetermined value, the operation proceeds to step S37. At the step S37, whether or not the value h of the horizontal counter is equal to "7" is judged. As a result, in the case where it is judged that the value h is less than 7, the value h of the horizontal counter is incremented by "1" (h=h+1) (step ST38). Then, the operation returns to the step ST33 to execute the above-mentioned steps ST35 to ST37.

When the value h of the horizontal counter becomes equal to "7", whether or not the number of data in a vertical direction within the detection window 1a of (7, 1) has reached a predetermined value is judged (step ST39). As a result, in the case where it is judged that the number of data in the vertical direction has not reached, the operation returns to the step ST 32. At this step, the value h of the horizontal counter is set to :1: for a second time to execute the steps ST33 and ST38.

In this way, it is possible to detect maximum values of conversion signals Se outputted from the respective detection windows 1a from (1, 1) at the left and upper end to (7, 1) at the right and upper end of the picture 1. These maximum values are assumed as focal point voltages E (1, 1) to E (7, 1) in the respective detection windows 1a.

Whether or not the value v of the vertical counter is equal to "7" is judged (step ST40). As a result, when it is judged that the value v is less than "7+, the value v of the vertical counter is incremented by "1" (v=v+ 1) (step ST41). Then, the operation returns to the step ST32 to execute the above-mentioned steps ST33 to ST40.

In this way, maximum values of conversion signals Se outputted from the respective detection windows 1a of the entirety of the picture 1 from (1, 1) to (7, 7) can be detected. From these maximum values, the focal point voltage E (h, v) can be detected. It is to be noted that the period during which such a detection is carried out is one field interval.

When the value v of the vertical counter becomes equal to "7", the operation proceeds to step S45 for the operation for a vertical blanking interval.

The operation for a vertical blanking interval will now be described.

During this time period, there is carried out the operation for providing distance information X from a logarithmic conversion detection signal $S_{E0}$ in a field earlier by one field and a logarithmic conversion detection signal $S_E$ in a present field, which are outputted from respective detection windows 1a from (1, 1) at the left and upper end to (7, 7) at the right and left end of the picture 1.

Namely, when the operation at the step ST40 is completed, stop information signal $S_D$ from the iris encoder 20, focal point distance information signal Sf from the zoom encoder 21, and a lens position signals ST from the lens position encoder 22 are taken in (step ST45).

Thereafter, the value v of the vertical counter and the value h of the horizontal counter are set to "1" and "1", respectively (step ST46). On the basis of a conversion signal Se of the detection window 1a of (1, 1) (focal point voltage E (h, v)), a movement distance $\delta$ of the lens position (not shown) of the lens system 11 determined by a lens position signal $S_T$ in a present field and a lens position signal $S_{T0}$ in a field earlier by one field, and a focal point voltage E0 (h, v) in a field earlier by one field when the position of the lens is moved by the distance $\delta$, an estimated value X (h, v) of distance information is determined in accordance with the following equation (1):

$$X(h, v) = T + \{E(h, v) - E0(h, v)\} / \{2(K \cdot D/f)^2 \delta\} - \delta/2 \qquad (1)$$

The equation (1) will now be described.

An output DET (h, v) from the detector 16 for the edge signal 15a in each detection window is approximately expressed by the following equation (2).

$$DET(h, v) = b \cdot EXP[-\{a \cdot (T - X(h, v)\}^2] \qquad (2)$$

In the equation (2), a is a parameter indicating depth of focal point. When the constant determined by the high frequency band component extraction method (characteristic of the high-pass filter 15) is assumed as K, and the F-number of the lens system 11 is assumed as K, the parameter a is expressed as follows:

$$a = K/F = K \cdot D/F$$

Further, b is a parameter or variable varying by the contrast of an object imaged by the imaging element 12. When logarithmic conversion is applied to the both sides of the equation (2), the following equation (3) is provided.

$$E(h, v) = \log b - \{a \cdot (T - X(h, v)\}^2 \qquad (3)$$

Further, a focal point voltage E0 (h, v) in a field earlier by one field is expressed by the following equation (4).

$$E0(h, v) = \log b - \{a \cdot (T - X(h, v) - \delta)\}^2 \qquad (4)$$

When the equation (4) is subtracted from the equation (3), b is eliminated as indicated by the following equation (5):

$$E(h, v) - E0(h, v) = -a^2 \{2\delta(T - X(h, v) - \delta)\}^2 \qquad (5)$$

In addition, since the parameter a in the above-mentioned equation (2) is expressed as K D/f, the equation (1) for determining estimated values X (h, v) of distance information in respective detection windows (h, v) can be varified from the above-mentioned equations (2) to (5).

equation (1)
$$\begin{aligned} X(h, v) &= T + \{F(h, v) - E0(h, v)\}/\{2a^2 \delta\} - \delta/2 \\ &= T + \{E(h, v) - F0(h, v)\}/ \\ & \quad \{2(K \cdot D/f)^2 \delta\} - \delta/2 \end{aligned}$$

Accordingly, by calculating the above-described equation (1) in connection with respective detection windows, distance information X (h, v) can be determined.

It is to be noted that the operating position of an in-focus lens (not shown) in the lens system 11 is synthetically judged by the microcomputer 23 on the basis of distance information X (h, v) obtained in this way to deliver an in-focus lens drive signal 23a to the lens system 11 to drive the in-focus lens by an in-focus lens drive circuit (not shown) in the lens system 11, thus making it possible to carry out a multiple-split type automatic focusing operation.

(b) Description of the Motion Information Detecting Circuit

The motion information detecting circuit 10B is comprised of a low-pass filter (LPF) 24, a binarization circuit 25, and a motion detecting circuit 26 as shown in FIG. 2.

The above mentioned low-pass filter (LPF) 24 limits the frequency band of a luminance signal 13b delivered from the previously described camera circuit 13 to deliver a low-pass filter output signal 24a to the binarization circuit 25.

The above-mentioned binarization circuit 25 compares the low-pass filter output signal 24a with a reference level to binarize it to deliver a binarized output signal 25a to the motion detecting circuit 26.

The above-mentioned motion detecting circuit 26 detects motion information M (h, v) having a quantity of movement and information in a movement direction by a binarized output signal 25a in a present field and a binarized output signal 25a in a field earlier by one field with respect to respective detection windows to deliver it to the microcomputer 23.

It is to be noted that the motion information detecting circuit 10B is not limited to the above-described circuit, but may be replaced by a well known motion detecting circuit.

(c) Description of the Microcomputer 23

The microcomputer 23 is comprise of adder, divider, multiplier, register, comparator, and counter (which are not shown), etc. In this microcomputer 23, a motion vector detection signal $S_R$ is detected by using the previously described distance information X (h, v) and motion information (h, v). This motion vector detection signal $S_R$ is determined by sum of products of motion information M (h, v) and weighting coefficients P (h, v) which will be described later. The means for determining these weighting coefficients P (h, v) takes 22 kinds of forms as shown in FIG. 5, and is comprised of detection means for effective detection window and weighting means for detection window which will be described later.

The detection means for effective detection window will be first described, the weighting means for the detection window will be then described, and means for determining motion vector detection signal $S_R$ by the weighting coefficients P (h, v) and the motion information M (h, v) will be finally described.

(i) Means for Judging Effective Detection Window

As the means for judging effective detection window, there are three kinds of judgment means which will be described below.

The first judgment means is judgment means for making comparisons between distance information corresponding to respective detection windows to assume one detection winder or more as an effective detection window in order of detection windows which take a greater value.

When it is now assumed that distance information X (h, v) is provided as shown in FIG. 6, for example, in the case where the number of effective detection windows is assumed to be five, detection windows of (5, 2), (3, 2), (7, 1), (3, 1) and (6, 1) become effective detection windows.

Actually, a comparator and registers in the microcomputer 23 are used as the means for judging effective detection windows. Coordinates (h, v) of the effective detection windows and distance information X (h, v) corresponding to these coordinates are registered into the registers.

Meanwhile, a moving object generally exists at a distance nearer than the background. Therefore, in accordance with the judgment means, since a detection window having greater distance information is deemed to be preferential, an effective detection window in taking, by using a video camera, a picture of a moving object 1b moving from the right to the left of the picture 1 becomes detection windows except for the portion emcompassed by dotted lines 2 in the picture 1. Since the above-mentioned weighting coefficients P (h, v) can be determined only in connection with effective detection windows, a motion vector detection signal $S_R$ can be determined without undergoing the influence of the motion vector B11 produced by movement of the moving object 1b.

The second judgment means is judgment means for comparing distance information corresponding to respective detection windows with a predetermined threshold value to assume detection windows above the predetermined threshold value to be an effective detection window. In FIG. 6, for example, in the case where the threshold value is 15, detection windows of (5, 2), (3, 2) and (7, 1) become effective detection windows.

In actual terms, the comparator, the registers and the ROM in the microcomputer 23 are used. Namely, threshold values stored in the ROM and distance information are compared with each other in succession by the comparator. As a result, in the case where distance information is greater than the threshold value, such distance information is stored into the register. These operations are carried out in connection with the detection window (1, 1) up to the detection window (7, 7) to discriminate effective detection windows. As a result, coordinates (h, v) of the effective detection windows and distance information X (h, v) corresponding to these coordinates are stored into the registers.

In accordance with the second judgment means, in FIG. 1A, because the detection windows having the distance inforamtion above the tresholod value are assumed as effective detection windows, when the threshold value exceeds the distance information of the moving object 1b (FIG. 1A), the effective detection windows become detection windows except for the portion encompassed by dotted lines 2 in the picture 1. Accordingly, a motion vector detection signal $S_R$ can be determined without undergoing the influence of the motion vector B11 produced by improvement of the moving object 1b. Moreover, because there is no need to decide the order of distance information which was required for the first judgement means, the second judgement means can be simply constructed.

The third judgment means is judgment means in which the first and second judgment means are combined with each other. This judgment means first judges roughly effective detection windows by the first judgment means thereafter to assume detection windows above a predetermined threshold value of the above effective detection windows to be finally effective detection windows. For example, in FIG. 6, in the case where the number of effective detection windows by the first judgment means is assumed to be five, and the threshold value by the second judgment means is assumed to be 16, a detection window of (5, 2) becomes an effective detection window.

It is to be noted that in the case where no effective detection window is detected by the second and third judgment means, calculations subsequent thereto cannot be carried out, resulting in the fact that no motion vector detection signal $S_R$ was detected.

In actual terms, the comparator, the registers and the ROM in the microcomputer 23 are used to carry out judgment by the previously described first judgment means thereafter to carry out judgment by the second judgment means, thereby making it possible to detect effective detection windows.

Then, weighting processing which will be described later is applied to effective detection windows obtained by any one of the first to third judgment means, or to all detection windows considered to be effective without carrying out judgment.

(ii) Weighting Means for Detection Means

The weighting means for the detection window will now be described.

As the weighting of the detection window, there are weighting means using distance information and weighting means using position information of the picture.

(a) Weighting Means Using Distance Information

As the weighting using distance information, there are two kinds of weighting means.

The first weighting means takes weighting coefficients which are directly proportional to the distance information. For example, in FIG. 6, in the case where detection windows of (5, 2), (3, 2), (7, 1), (3, 1) and (6, 1) are judged as effective detection windows by the above-described first judgment means, weighting coefficients P (h, v) corresponding to respective detection windows are expressed by the following equation (7):

$$P(h, v) = X(h, v)/[X(5, 2) + X(3, 2) + X(7, 1) + X(3, 1) + X(6, 1)] \tag{7}$$

It is to be noted that the equation (7) is calculated by the adder, the divider and the registers in the microcomputer 23.

The second weighting means carries out ranking of distance information in connection with effective detection windows to provide weighting coefficients Pn determined in advance in correspondence with the (priority) rank. For example, when distance information X (h, v) are assumed as X1, X2, ... Xn in order of the magnitude thereof, weighting coefficients P (h, v) corresponding to these distance information are P1, P2, ... Pn. It is to be noted that these weighting coefficients P1 to Pn have the relationship expressed as the following equation (8):

$$P1 + P2 + ... + Pn = 1 \tag{8}$$

These weighting coefficients Pn determined in advance are stored in the ROM of the microcomputer 23.

(b) Weighting Means Using Position Information of the Picture

As the means for carrying out weighting of the detection means, there is in the weighting means using position information of the picture in addition to the above-described weighting means using distance information. This weighting means using position information of the picture will now be described with reference to FIG. 7.

Here, position information Q (h, v) are numerals attached to respective detection windows of FIG. 7, and are information determined in advance in correspondence with positions of the picture. By these information, weighting coefficients P (h, v) are determined. For example, in FIG. 7, in the case where detection windows of (5, 2), (3, 2), (7, 1), (3, 1) and (6, 1) are judged as effective detection windows by the first judgment means, weighting coefficients P (h, v) corresponding to respective detection windows are expressed by the following equation (9):

$$P(h, v) = Q(h, v)/[Q(5, 2) + Q(3, 2) + Q(7, 1) + Q(3, 1) + Q(6, 1)] \quad (9)$$

It is to be noted that position information Q (h, v) is stored in the ROM provided in the microcomputer 23. The position information Q (5, 2) to Q (6, 1) of the previously described equation (9) are read out from the ROM, and are added at the adder. By dividing Q (h, v) by the added result at the divider, the weighting coefficient P (h, v) is provided.

(c) Weighting Means in Which Distance Information and Position Information of the Picture are Combined It is to be noted that the weighting coefficient may be determined by combination of the first weighting means using distance information and the weighting means using position information, or combination of the second weighting means using distance information and the weighting means using position information of the picture.

Namely, when the weighting coefficient obtained by the above-mentioned first weighting means using distance information is assumed as Pa(h, v), the weighting coefficient obtained by the above-mentioned second weighting means using distance information is assumed as Pb(h, v), the weighting coefficient obtained by the above-mentioned weighting means using position information of the picture is assumed as Pc(h, v), and effective detection windows are assumed as (5, 2), (3, 2), (7, 1), (3, 1) and (6, 1), the weighting coefficients Pd(h, v) obtained by combination of the first weighting means using distance information and the weighting means using position information of the picture are determined by the following equation (10), where Pd(h, v) are proportional to the products of Pa(h, v) and Pc(h, v).

equation (10)

$$Pd(h, v) = Pa(h, v) Pc(h, v)/\{Pa(5, 2) Pc(5, 2) + Pa(3, 2) Pc(3, 2) + Pa(7, 1) Pc(7, 1) + Pa(3, 1) Pc(3, 1) + Pa(6, 1) Pc(6, 1)\}$$

It is to be noted that the weighting coefficients Pd (h, v) may be determined by the following equation (11), where Pd(h, v) are proportional to the sum of Pa(h, v) and Pc(h, v).

equation (11)

$$Pd(h, v) = \{Pa(h, v) + Pc(h, v)\}/\{Pa(5, 2) + Pc(5, 2) + Pa(3, 2) + Pc(3, 2) + Pa(7, 1) + Pc(7, 1) + Pa(3, 1) + Pc(3, 1) + Pa(6, 1) + Pc(6, 1)\}$$

Further, the weighting coefficients Pe(h, v) obtained by combination of the second weighting means using distance information and the weighting means using position information of the picture are determined by the following equation (12), where Pe(h, v) are proportional to the products of Pb(h, c) and Pc(h, v):

equation (12)

$$Pe(h, v) = Pb(h, v) Pc(h, v)/\{Pb(5, 2) Pc(5, 2) + Pb(3, 2) Pc(3, 2) + Pb(7, 1) Pc(7, 1) + Pb(3, 1) Pc(3, 1) + Pb(6, 1) Pc(6, 1)\}$$

It is to be noted that the weighting coefficients Pe(h, v) may be obtained by the following equation (13), where Pe(h, v) are proportional to the products Pa(h, v) and Pc(h, v):

equation (13)

$$Pc(h, v) = \{Pb(h, v) Pc(h, v)\}/\{Pb(5, 2) + Pc(5, 2) + Pb(3, 2) + Pc(3, 2) + Pb(7, 1) + Pc(7, 1) + Pb(3, 1) + Pc(3, 1) + Pb(6, 1) + Pc(6, 1)\}$$

It is to be noted that the above-mentioned equations (10) to (13) may be determined by the adder, the divider, the multiplier and the registers in the microcomputer 23.

(iii) Means for Determining a Motion Vector Detection Signal by the Weighting Coefficients and the Motion Information A motion vector detection signal SR is determined by weighted-averaging the mortion information M(h, v) with the above-described weighting coefficients P(h, v). For example, when weighting coefficients determined with respect to five effective detection windows are assumed as P(5, 2), P(3, 2), P(7, 1), P(3, 1) and P(6, 1), the motion vector detection signal SR is expressed by the following equation (14):

equation (14)

$$R = P(5, 2) M(5, 2) + P(3, 2) M(3, 2) + P(7, 1) M(7, 1) + P(3, 1) M(3, 1) + P(3, 1) M(3, 1)$$

It is to be noted that the equation (14) may be determined by the adder, the multiplier and the registers in the microcomputer 23.

In accordance with the first embodiment, in order to determine a motion vector detection signal $S_R$, distance information X(h, v) is used, thereby making it possible to consider motion information M(h, v) corresponding to detection windows where an object remote from the imaging element 12 exists to be important. Accordingly, even in the case where a moving object lb exists within the picture 1, motion vectors can be provided from the portion of background. As a result, it is possible to suitably detect motion vectors produced as the result of fluctuation of a video camera. By using these motion vectors, it is possible to correct disturbance (blurring) of an image produced by fluctuation of a video camera.

A second embodiment will now be described.

The second embodiment is directed to improvement of the first embodiment with respect to detection of motion information. In FIG. 8, this embodiment differs from the first embodiment in that a path from the microcomputer 23 up to the motion detecting circuit 26 is added. The same reference numerals are respectively attached to the same components as those of FIG. 2, and their explanation will be omitted.

In the first embodiment, the motion detection circuit 26 detected motion information M(h, v) with respect to all the detection windows. However, in the motion detection circuit 26, motion information M(h, v) required for calculating and outputting a motion vector detection signal $S_R$ which is a final output of the motion vector detecting circuit 10 is sufficient only for effective detection windows. To realize this, an approach has been employed to deliver effective detection window information Ss detected in the microcomputer 23 to the motion detecting circuit 26, thus to determine motion information M(h, v) with respect to only the effective detection windows.

As a result, since the computational burden on the motion detection circuit 26 can be lessened, it is possible to simplify the motion detecting circuit 26.

A third embodiment will now be described.

The third embodiment is directed to a further improvement in the first and second embodiments with respect to supply to the motion correction circuit of the motion vector detecting signal. In FIG. 9, this embodiment differs from the embodiment of FIG. 2 in that a limiter circuit 27 is added in a path from the microcomputer 23 up to the motion correction circuit 14. The same reference numerals are respectively attached to the same components as those of FIG. 2, and their explanation will be omitted.

In the first and second embodiments, a motion vector detection signal SR computationally determined by the microcomputer 23 was directly delivered to the motion correction circuit 14. However, in the case where a quantity of movement of the motion vector detection signal $S_R$ is smaller than an interval of interlaced scanning of a television image receiver, if motion correction is made, flicker takes place in the picture, resulting in deteriorated picture quality. To improve this, a measure is taken to provide a limiter circuit 27 in a path from the microcomputer 23 up to the motion correction circuit 14 to thereby allow the motion vector detection signal $S_R$ not to be delivered to the motion correction circuit 14 when a quantity of movement of the motion vector detection signal $S_R$ is not above a predetermined threshold value.

As a result, the motion correction circuit 14 is not required to make motion correction which may cause degradation of the picture quality. Accordingly, a composite video signal 14a of an extremely high picture quality free from flicker can be provided.

Although not illustrated and described in detail, a composite video signal 14a of an extremely excellent picture quality can be outputted by a fourth embodiment in which the above-mentioned second and third embodiments are combined.

It is to be noted that explanation has been given in the above-described first to third embodiments on the assumption that the positions in the picture 1 of the detection window for detecting the distance information X(h, v) and the motion information M(h, v) are in correspondence with each other, but they are not necessarily required to be completely in correspondence with each other. In actual terms, it is only required that they are substantially in correspondence with each other within the range where an error of the motion vector detection signal $S_R$ is allowable.

It is to be noted that while distance information X(h, v) is determined with respect to all the detection windows in the above-described first to fourth embodiments, an approach may be employed to determine distance information X(h, v) with respect to partial detection windows to determine the motion vector detection signal $S_R$ by the distance information X(h, v) and motion information M(h, v) corresponding to the partial detection windows. Particularly, a scheme of allowing detection windows around the picture 1 to be partial detection windows is effective because there exist generally many portions corresponding to the background according as the distance up to the periphery of the picture 1 is short.

It is to be noted that while the distance information X(h, v) is determined from the luminance signal 13b obtained from the imaging element 12 in the first to fourth embodiments, this invention is not limited to such a method. In addition to this, it is a matter of course to use distance information obtained from a distance measurement device using a well known infrared ray.

What is claimed is:

1. A motion vector detecting apparatus for detecting movement of an image to prevent disturbance of the image, comprising:

imaging means for imaging objects within a picture window and forming a picture signal representative thereof;

distance information detecting means for detecting distance information from said objects to said imaging means associated with each of a plurality of respective detection windows obtained by dividing said picture window into plurality of blocks;

motion information detecting means for detecting motion information associated with objects in each of said respective detection windows; and calculation means for determining weighting coefficients on the basis of at least said distance information, and for determining a motion vector on the basis of said weighting coefficients and said motion information.

2. A motion vector detecting apparatus as set forth in claim 1, wherein said imaging means comprises:

a lens system for allowing light from said objects to be transmitted therethrough and forming an optical image of said objects;

an imaging element for photoelectrically converting said optical image to generate a video signal; and a camera circuit for implementing a predetermined processing to the video signal output by said imaging element to generate and output said picture signal which comprises a composite video signal and a luminance signal; said motion detector apparatus further comprising:

a motion correction circuit responsive to said motion vector determined by said calculation means and said composite video signal generated by said camera circuit to generate a motion corrected video signal for use by a signal recording/reproducing system.

3. A motion vector detecting apparatus as set forth in claim 2, wherein said distance information detecting means comprises:
- a high-pass filter (HPF) for outputting an edge signal generated by extracting a high frequency band signal component of said luminance signal output by said camera circuit;
- a detector for detecting the edge signal output by said HPF to output a detection signal corresponding to a contour of an object moving within a region defined by said picture signal;
- a logarithmic converter for applying logarithmic conversion to the detection signal from said detector to output a logarithmic conversion detection signal;
- an analog-to-digital (A/D) converter for outputting a conversion signal as a focal point signal obtained by applying analog-to-digital conversion to the logarithmic conversion detection signal from said logarithmic conversion;
- an iris encoder for outputting a stop information signal obtained by applying analog-to-digital conversion to an iris information signal detected by said lens system;
- a zoom encoder for outputting a focal length information signal obtained by applying analog-to-digital conversion to a zoom information signal detected by said lens system;
- a lens position information encoder for outputting a lens position information signal obtained by applying analog-to-digital conversion to a lens information signal detected by said lens system; and
- a calculation circuit supplied with said conversion signal, said stop information signal, said focal length information signal, and said lens position information signal respectively output by said A/D converter, said iris encoder, said zoom encoder, and said lens position information encoder to carry out calculation based on said respective signals in order to detect in succession distance information associated with each of said detection windows.

4. A motion vector detecting apparatus as set forth in claim 2, wherein said motion information detecting means comprises:
- a low-pass filter (LPF) for outputting a low frequency band component signal generated by band-limiting the low frequency band component of said luminance signal output by said camera circuit;
- a binarization circuit for comparing said low frequency band component signal from said LPF with a reference level to output a binary signal representative thereof; and
- a motion detection circuit successively supplied with binary signals from said binarization circuit associated with each of said detection windows to make comparison between a binary signal in a present field and a binary signal in a previous field to output motion information having information indicative of a quantity of movement and movement directions within said picture signal.

5. A motion vector detecting apparatus as set forth in claim 4, wherein said motion detecting means provided in said motion information detecting means is supplied with effective detection window information output by from said calculation means to detect motion information only in connection with effective detection windows on the basis of said effective detection window information.

6. A motion vector detecting apparatus as set forth in claim 4, wherein said motion correction circuit is directly supplied with a motion vector detection signal output by said calculation means to read out, in accordance with a predetermined vector, said composite video signal output by said camera circuit.

7. A motion vector detecting apparatus as set forth in claim 6, which further comprises a limiter circuit connected between said calculation means and said motion correction circuit, and supplied with said motion vector detection signal outputted from said calculation means to deliver said motion vector detection signal to said motion correction circuit only when a quantity of motion of said detection signal is above a predetermined threshold level.

8. A motion vector detecting apparatus for detecting movement of an image to prevent disturbance of the image, comprising:
- imaging means for imaging objects in a picture window and forming a picture signal representative thereof;
- distance information detecting means for detecting distance information from said objects to said imaging means associated with each of a plurality of respective detection windows obtained by dividing said picture window into a plurality of blocks;
- judgment means for determining a representative detection window on the basis of distance information associated with each of said detection windows;
- motion information detecting means for detecting motion information associated with said representative detection window;
- motion information detection means for detecting motion information associated with each of said detection window;
- calculation means for determining weighting coefficients on the basis of at least said distance information associated with said representative detection window, and for determining a motion vector on the basis of said weighting coefficients and said motion information.

9. A motion vector detecting apparatus as set forth in claim 8, wherein said judgment means determines said representative detection window on the basis of a comparison of the distance information associated with each of said detection windows, or a comparison between said distance information associated with each of said detection windows and a threshold value.

* * * * *